United States Patent
Pan et al.

(10) Patent No.: US 9,220,153 B2
(45) Date of Patent: Dec. 22, 2015

(54) ILLUMINATING APPARATUS AND CONTROL METHOD FOR KEEPING A CONSTANT TOTAL BRIGHTNESS OF AMBIENT LIGHT AND LIGHT PRODUCED BY THE ILLUMINATING APPARATUS

(71) Applicant: LUXUL TECHNOLOGY INCORPORATION, New Taipei (TW)

(72) Inventors: Cheng-Hung Pan, New Taipei (TW); Eric Wen-Chien Chen, New Taipei (TW)

(73) Assignee: LUXUL TECHNOLOGY INCORPORATION, New Taipei (TW)

( * ) Notice: Subject to any disclaimer, the term of this patent is extended or adjusted under 35 U.S.C. 154(b) by 447 days.

(21) Appl. No.: 13/758,049

(22) Filed: Feb. 4, 2013

(65) Prior Publication Data

US 2013/0257294 A1    Oct. 3, 2013

(30) Foreign Application Priority Data

Mar. 30, 2012    (TW) .............................. 101111344 A

(51) Int. Cl.
H05B 37/02        (2006.01)
(52) U.S. Cl.
CPC ............ *H05B 37/02* (2013.01); *H05B 37/0218* (2013.01); *H05B 37/0245* (2013.01); *Y02B 20/46* (2013.01); *Y02B 20/48* (2013.01)

(58) Field of Classification Search
CPC .................................................. H05B 37/0218
USPC .................................. 315/158, 297, 134, 307
See application file for complete search history.

(56) References Cited

U.S. PATENT DOCUMENTS

| | | | | |
|---|---|---|---|---|
| 8,749,172 B2* | 6/2014 | Knapp | ........................... | 315/307 |
| 2012/0262069 A1* | 10/2012 | Reed | ............................. | 315/130 |
| 2013/0063042 A1* | 3/2013 | Bora et al. | ..................... | 315/292 |

* cited by examiner

*Primary Examiner* — Daniel D Chang
(74) *Attorney, Agent, or Firm* — patenttm.us

(57) ABSTRACT

An illuminating apparatus and control method is adapted to keep a constant total brightness of the ambient light and light produced by the illuminating apparatus. The illuminating apparatus has a control module storing an objective brightness and detect the ambient brightness through an optical sensor. The control module turns on a lamp according to a comparison result of the objective brightness and the ambient brightness. Hence, a total brightness of the lamp's brightness and the ambient brightness is adjustable to be equally bright as the objective brightness. The illuminating apparatus of the invention does not provide excessive brightness and accordingly conserves electric power energy.

9 Claims, 4 Drawing Sheets

ILLUMINATING APPARATUS AND CONTROL METHOD FOR KEEPING A CONSTANT TOTAL BRIGHTNESS OF AMBIENT LIGHT AND LIGHT PRODUCED BY THE ILLUMINATING APPARATUS

CROSS-REFERENCE TO RELATED APPLICATIONS

This application claims the benefit of Taiwan patent application No. 101111344, filed on Mar. 30, 2012, the disclosure of which is incorporated herein in its entirety by reference.

BACKGROUND OF THE INVENTION

1. Field of the Invention

The present invention relates to an illuminating apparatus, and more particularly to an illuminating apparatus and control method for keeping a constant total brightness of ambient light and light produced by the illuminating apparatus.

2. Description of Related Art

Intelligent household appliances are developed for providing people with a convenient living environment. Sensor-activated LED illuminating apparatus is one of the popular intelligent household appliances.

A conventional sensor-activated LED illuminating apparatus comprises a lamp and an optical sensing switch for detecting ambient brightness. The optical sensing switch is electrically connected to the lamp. When the ambient brightness is lower than a threshold brightness, the optical sensing switch is turned on to activate the lamp. When the ambient brightness is higher than the threshold brightness, the optical sensing switch is turned off to inactivate the lamp. Hence, the lamp can be automatically activated under poor illumination and is inactivated under sufficient illumination.

The natural ambient brightness in environment changes gradually. For example, the ambient brightness gradually changes through dawn, morning, sunset and night or through sunny day and cloudy or rainy day. However, the LED illuminating apparatus operates only in two statuses: turned-on and turned-off without adjustable degrees of brightness.

Based on a user's habit for using the LED illuminating apparatus, the light produced from the LED illuminating apparatus should be bright enough in complete darkness. But the LED illuminating apparatus may be turned on in cloudy or rainy day or at dawn with some dim light in the ambient environment. In that case, the LED illuminating apparatus over illuminates with excessive brightness, causing waste of electric power energy. The conventional LED illuminating apparatus is still inadequate as an intelligent household appliance for saving electric power energy.

SUMMARY OF THE INVENTION

An objective of the present invention is to provide an illuminating apparatus for keeping a constant total brightness of ambient light and light produced by the illuminating apparatus. The illuminating apparatus of the invention adjusts its brightness according to an ambient brightness to keep the total brightness constant without providing excessive brightness. Accordingly, the electric power energy is efficiently saved.

The illuminating apparatus of the invention comprises:
a lamp;
an optical sensor generating a detection signal according to an ambient brightness; and
a control module electrically connected to the lamp and the optical sensor and storing an objective brightness and an objective current value, wherein the control module receives the detection signal to acquire the ambient brightness, compares the objective brightness with the ambient brightness to acquire a comparison result, calculates a ratio of the comparison result to the objective brightness, calculates a driving current value according to a product of multiplying the ratio and the objective current value, and generates a driving current based on the driving current value to activate the lamp.

The illuminating apparatus of the invention can detect the ambient brightness through the optical sensor and can adjust the brightness of the lamp according to the comparison result of the objective brightness and the ambient brightness. Hence, a total brightness of the lamp's brightness and the ambient brightness is adjustable to be equally bright as the objective brightness. The illuminating apparatus of the invention does not provide excessive brightness and conserves electric power energy.

Another objective of the invention is to provide a control method for keeping a constant total brightness of ambient light and light produced by an illuminating apparatus. The control method of the invention is executable by a controller and includes the steps of:

setting an objective brightness and an objective current value to a controller;

receiving a detection signal corresponding to an ambient brightness from an optical sensor;

acquiring a comparison result of the objective brightness and the ambient brightness;

calculating a ratio of the comparison result to the objective brightness;

calculating a driving current value according to a product of multiplying the ratio and the objective current value; and outputting a driving current according to the driving current value to a lamp.

In conclusion, the driving current is determined by the controller according to the comparison result of the objective brightness and the ambient brightness. The lamp is activated by receiving the driving current to compensate for the ambient brightness when the ambient brightness is lower than the objective brightness. The control method of the invention achieves automatic brightness control and conserves electric power energy.

DETAILED DESCRIPTION OF THE PREFERRED EMBODIMENT

Figure 1:
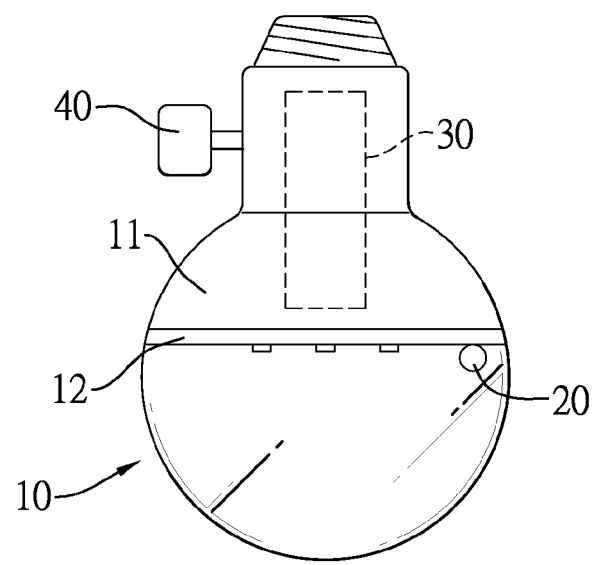
FIG. 1 is a plan view of the illuminating apparatus of the invention.
Figure 2:
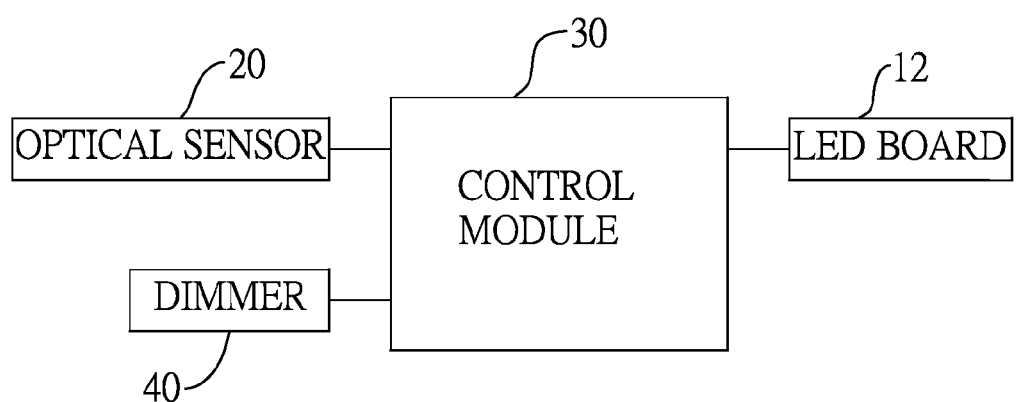
FIG. 2 is a circuit block diagram of the illuminating apparatus of the invention.

With reference to FIGS. 1 and 2, the illuminating apparatus of the invention comprises a lamp 10, an optical sensor 20, a control module 30 and a dimmer 40.

In this embodiment, the lamp 10 is an LED lamp and comprises a shell 11 and an LED board 12. The LED board 12 is mounted in the shell 11.

The optical sensor 20 detects an ambient brightness and correspondingly generates a detection signal according to the ambient brightness. In this embodiment, the optical sensor 20 is mounted in the shell 11.

The control module 30 is electrically connected to the LED board 12 and the optical sensor 20. The control module 30 executes a control method and stores an objective brightness ($L_X$) and an objective current value ($I_Z$). In this embodiment, the control module 30 is mounted in the shell 11 of the lamp 10. The control module 30 sets a driving current as the objective current value ($I_Z$), such that the driving current is capable of activating the LED board 12 to produce light with the objective brightness ($L_X$).

The dimmer 40 is electrically connected to the control module 30 and can be operated by a user to adjust the objective brightness ($L_X$) to the control module 30. In this embodiment, the dimmer 40 is a rotary switch mounted on the shell 11.

Figure 3:
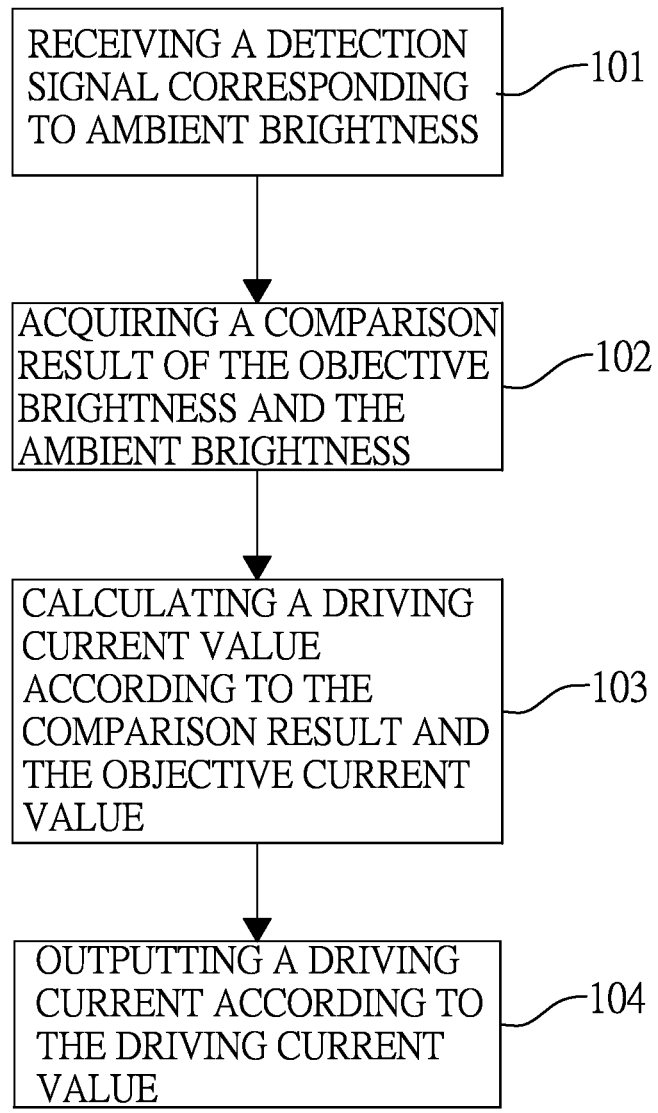
FIG. 3 is a flow chart of the method of the invention.

With reference to FIG. 3, the control method is executable by the control module 30 and comprises the steps as described below.

The control module 30 receives the detection signal from the optical sensor 20 to acquire the ambient brightness ($L_Y$) (step 101).

After the control module 30 acquires the ambient brightness ($L_Y$), the control module 30 compares the objective brightness ($L_X$) with the ambient brightness ($L_Y$) to acquire a comparison result ($L_{lamp}$), wherein $L_{lamp}=L_X-L_Y$ (step 102). The comparison result ($L_{lamp}$) stands for a brightness of light that the lamp 10 should produce.

After the control module 30 acquires the comparison result ($L_{lamp}$), the control module 30 calculates a ratio of the comparison result ($L_{lamp}$) to the objective brightness ($L_X$) and calculates a driving current value ($I_{out}$) according to a product of multiplying the ratio and the objective current value ($I_Z$) (step 103), wherein $$I_{out} = \frac{L_{lamp}}{L_X} \times I_z = \frac{(L_X - L_Y)}{L_X} \times I_z.$$

In this embodiment, when the control module 30 determines that the comparison result ($L_{lamp}$) is lower than zero, the control module 30 sets the driving current value ($I_{out}$) as zero.

After the control module 30 acquires the driving current value ($I_{out}$), the control module 30 outputs a driving current according to the driving current value ($I_{out}$) to activate the lamp 10 (step 104). The lamp 10 then produces light with a brightness of the comparison result ($L_X-L_Y$).

Figure 4:
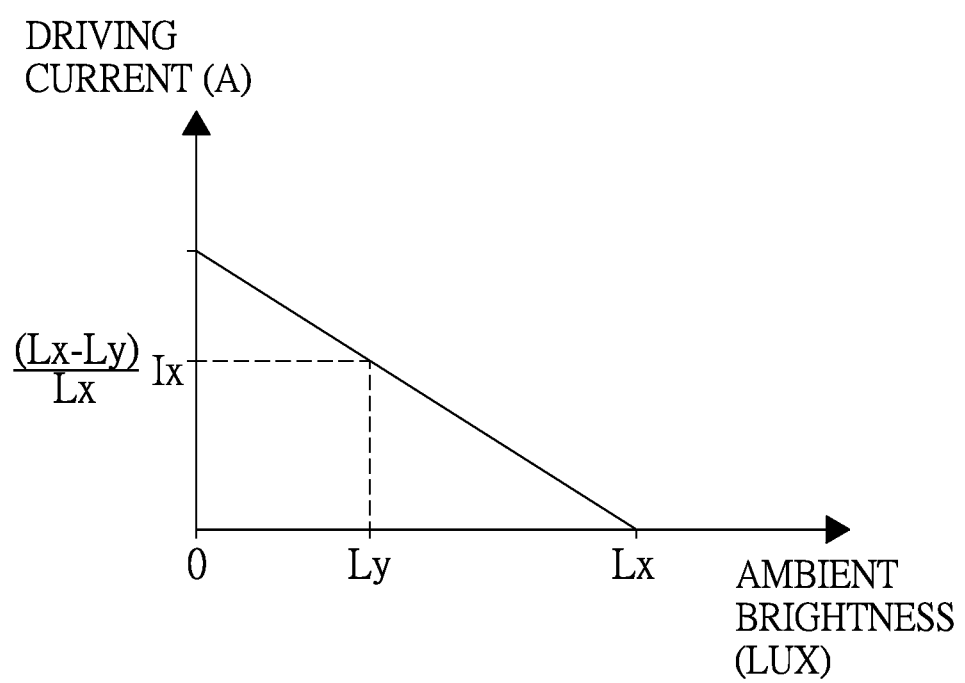
FIG. 4 is a chart of the driving current and the ambient brightness.

With reference to FIG. 4, when the ambient brightness ($L_Y$) is zero (complete darkness), the driving current value ($I_{out}$) is equal to the objective current value ($I_Z$). The lamp 10 produces light with the objective brightness ($L_X$). When the ambient brightness ($L_Y$) is higher than the objective brightness ($L_X$), the driving current value ($I_{out}$) is reduced to zero. The lamp 10 is then inactivated. The relationship of LED brightness and a driving current of the LED is approximately linear. Hence, the ratio of the objective brightness ($L_X$) to the objective current value ($I_Z$) can be regarded as the ratio of the LED brightness to the driving current, such that $$I_{out} \times \frac{L_X}{I_Z} = \frac{(L_X - L_Y) \times I_Z}{L_X} \times \frac{L_X}{I_Z} = (L_X - L_Y).$$

The total brightness of the brightness of the lamp 10 and the ambient brightness is equal to the objective brightness ($L_X$). The illuminating apparatus of the invention can automatically keep a total brightness of the ambient brightness and the lamp's brightness constant with the objective brightness ($L_X$). To prevent the optical sensor 20 from being affected by the lamp 10, the control module 30 can periodically inactivate the LED board 12. The optical sensor 20 then correctly detects the ambient brightness when the LED board 12 is inactivated.

Figure 5:
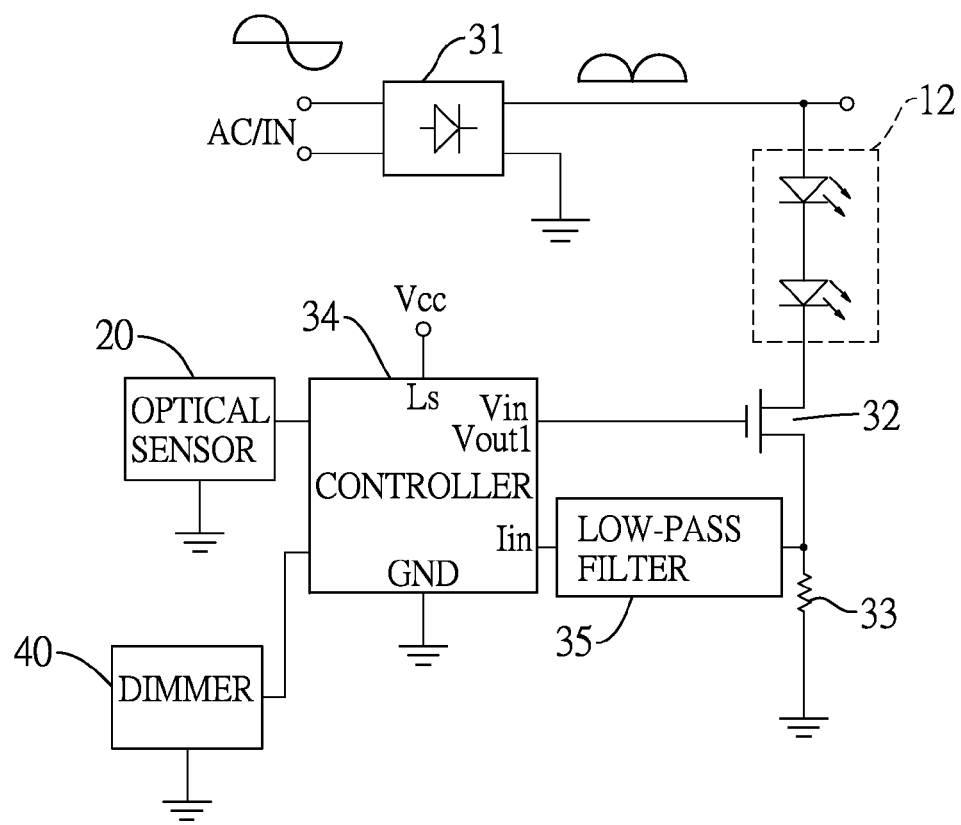
FIG. 5 is a circuit diagram of the illuminating apparatus of the invention.

With reference to FIG. 5, the control module 30 comprises a full-bridge rectifier 31, a voltage-controlled transistor 32, a current detector 33 and a controller 34.

The full-bridge rectifier 31 has two input terminals, a positive output terminal and a negative output terminal. The two input terminals are electrically connected to an AC power to receive an AC voltage. The positive output terminal is electrically connected to an anode terminal of the LED board 12. The negative output terminal is grounded. The full-bridge rectifier 31 converts the AC voltage to a DC sine voltage for the LED board 12.

The voltage-controlled transistor 32 has a first terminal, a second terminal and a gate. The first terminal is electrically connected to a cathode terminal of the LED board 12.

The current detector 33 is electrically connected between the second terminal of the voltage-controller transistor 32 and the negative output terminal of the full-bridge rectifier 31 to form a current loop. In this embodiment, the current detector 33 is a resistor.

The controller 34 is electrically connected to the optical sensor 20, the dimmer 40, the gate of the voltage-controlled transistor 32 and the current detector 33 through a low-pass filter 35. The controller 34 executes the control method, stores the objective brightness ($L_X$) and the objective current value ($I_Z$), detects the driving current flowing through the LED board 12 through the current detector 33 and controls the voltage-controlled transistor 32 to adjust the driving current as mentioned above.

For example, in an initial condition, the illuminating apparatus of the invention can be operated in a completely dark environment, such that the ambient brightness ($L_Y$) detected by the optical sensor 20 is zero. Then, the dimmer 40 can be operated by a user to adjust the objective brightness ($L_X$) of interest. As the environment is in complete darkness, the user can sensitively observe the light variance of the illuminating apparatus of the invention and can accordingly adjust the objective brightness ($L_X$). After the objective brightness ($L_X$) is set, the controller 34 detects a present driving current of the LED board 12 through the current detector 33 to set the present driving current as the objective current value ($I_Z$). Hence, the illuminating apparatus of the invention allows the user to adjust the objective brightness ($L_X$) of interest. After the objective brightness ($L_X$) is set, the illuminating apparatus of the invention can automatically adjust the brightness of the lamp 10 to keep the total brightness of the ambient brightness and lamp's brightness constant with the objective brightness ($L_X$) when the ambient brightness ($L_Y$) is lower than the objective brightness ($L_X$).

In short, the illuminating apparatus of the invention can automatically adjust the brightness of the lamp 10 according to the ambient brightness to keep the total brightness constant. When the ambient brightness is higher than the objective brightness, the controller 34 then turns off the LED board 12. The LED board 12 does not provide excessive brightness such that electric power energy is saved. The illuminating apparatus of the invention efficiently saves electric power energy as an intelligent household appliance.

What is claimed is:

1. An illuminating apparatus comprising:
    a lamp;
    an optical sensor generating a detection signal according to an ambient brightness; and
    a control module electrically connected to the lamp and the optical sensor and storing an objective brightness and an objective current value, wherein the control module receives the detection signal to acquire the ambient brightness, compares the objective brightness with the ambient brightness to acquire a comparison result, calculates a ratio of the comparison result to the objective brightness, calculates a driving current value according to a product of multiplying the ratio and the objective current value, and generates a driving current based on the driving current value to activate the lamp.

2. The illuminating apparatus as claimed in claim 1 further comprising a dimmer electrically connected to the control module for setting the objective brightness.

3. The illuminating apparatus as claimed in claim 1, wherein
    the lamp has a shell and an LED board mounted in the shell;
    the optical sensor is mounted in the shell; and
    the control module is mounted in the shell and is electrically connected to the LED board.

4. The illuminating apparatus as claimed in claim 2, wherein
    the lamp has a shell and an LED board mounted in the shell;
    the optical sensor is mounted in the shell;
    the control module is mounted in the shell and is electrically connected to the LED board; and
    the dimmer is mounted on the shell.

5. An illuminating apparatus comprising:
    a lamp;
    an optical sensor generating a detection signal according to an ambient brightness; and
    a control module electrically connected to the lamp and the optical sensor and storing an objective brightness and an objective current value, wherein the control module receives the detection signal to acquire the ambient brightness, compares the objective brightness with the ambient brightness to acquire a comparison result, calculates a ratio of the comparison result to the objective brightness, calculates a driving current value according to a product of multiplying the ratio and the objective current value, and generates a driving current based on the driving current value to activate the lamp,
    further comprising a dimmer electrically connected to the control module for setting the objective brightness, wherein
    the lamp has a shell and an LED board mounted in the shell;
    the optical sensor is mounted in the shell;
    the control module is mounted in the shell and is electrically connected to the LED board; and
    the dimmer is mounted on the shell; and
    wherein the control module comprises:
        a full-bridge rectifier electrically connected between an AC power and the LED board to provide a DC sine voltage to the LED board;
        a voltage-controlled transistor having:
            a first terminal electrically connected to a cathode terminal of the LED board;
            a second terminal; and
            a gate;
        a current detector electrically connected between the second terminal of the voltage-controlled transistor and the full-bridge rectifier to form a current loop; and
        a controller electrically connected to the optical sensor, the dimmer, the gate of the voltage-controlled transistor and the current detector through a low-pass filter, storing the objective brightness and the objective current value.

6. The illuminating apparatus as claimed in claim 5, wherein
    the dimmer is a rotary switch; and
    the current detector is a resistor.

7. The illuminating apparatus as claimed in claim 6, wherein the full-bridge rectifier has:
    two input terminals connected to the AC power;
    a positive output terminal connected to an anode terminal of the LED board; and
    a negative output terminal being grounded.

8. A method for automatically adjusting brightness, the method being executable by a controller comprising the steps of:
    setting an objective brightness and an objective current value to a controller;
    receiving a detection signal corresponding to an ambient brightness from an optical sensor;
    acquiring a comparison result of the objective brightness and the ambient brightness;
    calculating a ratio of the comparison result to the objective brightness;
    calculating a driving current value according to a product of multiplying the ratio and the objective current value; and
    outputting a driving current according to the driving current value to a lamp.

9. The method as claimed in claim 8, wherein in the step of calculating the driving current value, when the objective brightness is lower than the ambient brightness, the driving current value is set as zero by the controller.

* * * * *